E. L. DEAN.
SAWING MACHINE.
APPLICATION FILED JUNE 8, 1918.

1,326,713.

Patented Dec. 30, 1919.
6 SHEETS—SHEET 3.

WITNESSES
H. T. Walker
C. A. Murdock

INVENTOR
E. L. Dean
BY
ATTORNEYS

E. L. DEAN.
SAWING MACHINE.
APPLICATION FILED JUNE 8, 1918.

1,326,713.

Patented Dec. 30, 1919.
6 SHEETS—SHEET 5.

WITNESSES
H. T. Walker

INVENTOR
E. L. Dean
BY
ATTORNEYS

E. L. DEAN.
SAWING MACHINE.
APPLICATION FILED JUNE 8, 1918.

1,326,713.

Patented Dec. 30, 1919.
6 SHEETS—SHEET 6.

WITNESSES
H. T. Walker

INVENTOR
E. L. Dean
BY
ATTORNEYS

UNITED STATES PATENT OFFICE.

EDWIN LOUIS DEAN, OF SHREWSBURY, MASSACHUSETTS.

SAWING-MACHINE.

1,326,713.

Specification of Letters Patent.

Patented Dec. 30, 1919.

Application filed June 8, 1918. Serial No. 238,946.

*To all whom it may concern:*

Be it known that I, EDWIN LOUIS DEAN, a citizen of the United States, and a resident of Shrewsbury, in the county of Worcester and State of Massachusettes, have invented a new and Improved Sawing-Machine, of which the following is a full, clear, and exact description.

Among the principal objects which the present invention has in view are: to provide a machine of the character mentioned readily adjustable to various working positions to permit its use in felling and trimming timber; to provide means for handling the machine when adjusting the same; to reduce the man power necessary to the operation of the machine; to reduce the risks in the field of timber; and to facilitate the shipment of timber from the forest to the mill.

*Drawings.*

*Description.*

As seen in the drawings, the machine embodies three operatively connected units, to wit, a platform member 15, which is circular in shape and provided with an inner circular track groove 16, wherein is mounted a series of rollers 17. The rollers 17 reduce the friction incident to moving the working frame 18. The frame 18 is constructed of flat bars, to support the rails 19 and racks 20. The rails 19 and racks 20 are straight and disposed in parallel relation. The frame 18 also provides tapped openings for the engagement of elongated screws 21. The screws 21 have hand wheels 22 at the extremities thereof, said hand wheels extending beyond the sides of the frame 18. As seen best in Fig. 1 of the drawings, there are four screws 21. These screws are spaced apart so that they can engage the trunk of a tree at suitable distances on opposite sides of a median plane of the tree. These screws are for steadying the structure when the motor is operating the saw blade 23.

The frame 18 constitutes the carrying member on which the sawing mechanism is transported. For this purpose, the frame 18 is provided with carrying handles 24 secured to a side of the said frame.

Figure 1:
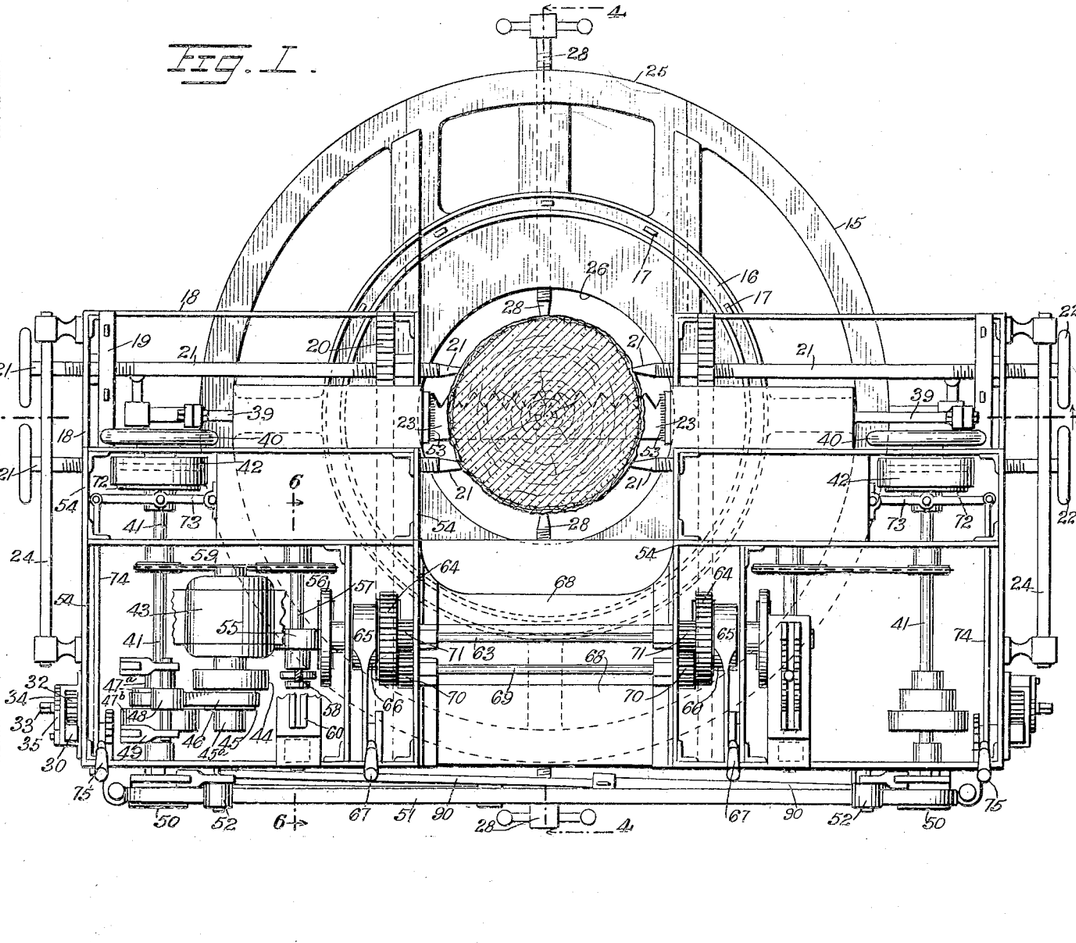
Figure 1 is a plan view of a machine constructed and arranged in accordance with the present invention and showing in conjunction therewith the stump of a tree as being operated upon by the machine.

The platform 15 has a removable section 25, partly forming a central opening 26. The section 25 is removed to permit the platform being adjusted in surrounding relation to the tree trunk, as shown in Fig. 1. The section 25 has two pins, one on each side to prevent said section from drawing out when screws 28 are tightened.

Figure 2:
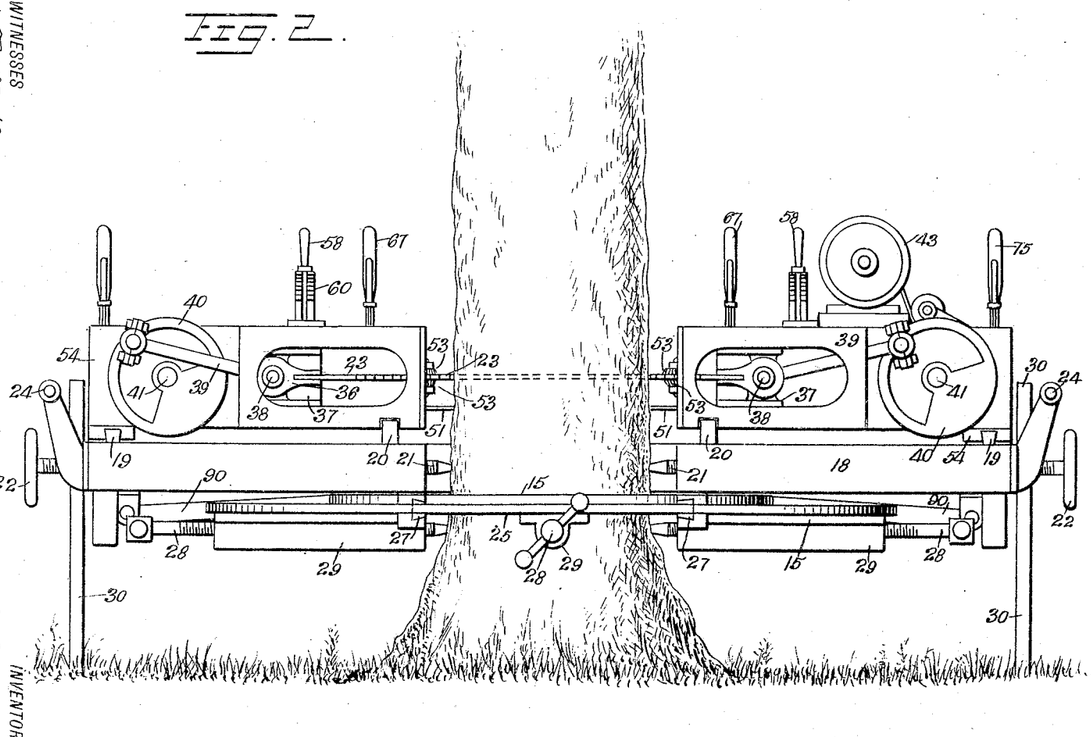
Fig. 2 is a front elevation of the same.

As seen best in Fig. 2 of the drawings, the section 25 has at the lateral edges thereof, dovetailed rails 27, which fit corresponding grooves in the adjacent portion of the platform 15. The platform 15 is skeleton in form and is held in active service to the tree trunk, by means of the pointed screws 28. The threads of the screws 28 engage threads in housings 29 pendent from the under side of the platform 15. The platform 15 is provided to aid in adjusting the frame 18, which is lifted by means of the handles 24 on to the platform 15 after the screws 28 have been driven into the trunk of the tree. The rollers 17 assist thereafter in moving the frame circularly about the trunk of the tree to adjust the frame to the desired cutting position.

Figure 3:
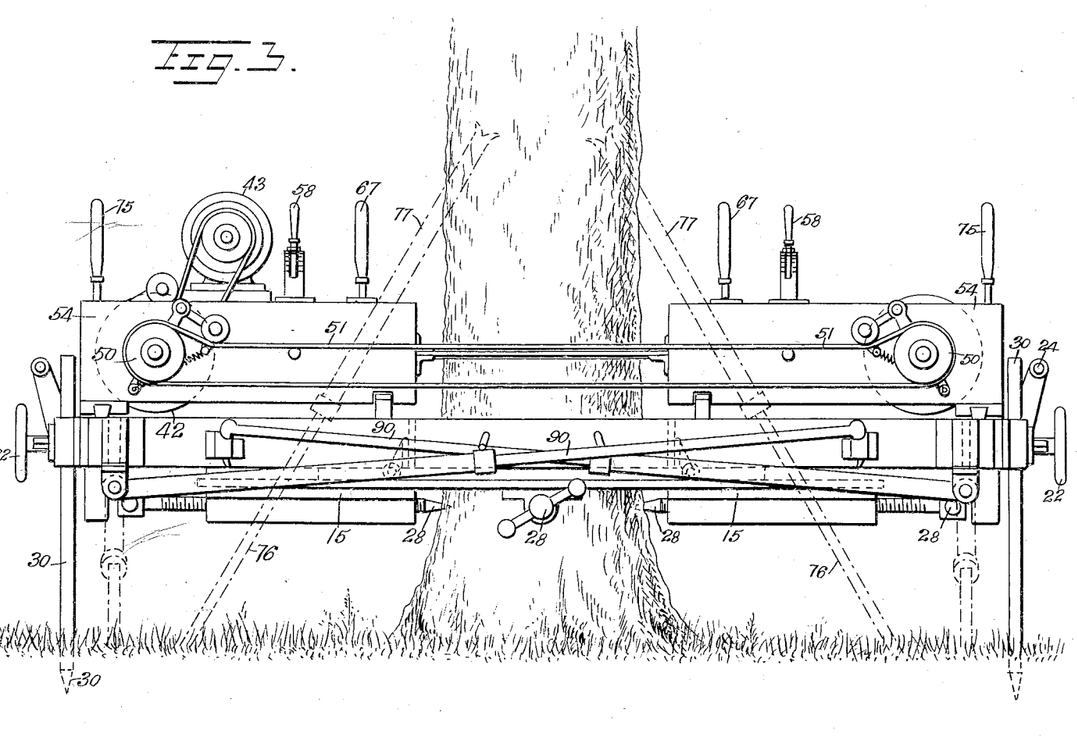
Fig. 3 is a rear elevation of the same.

When the frame 18 has been thus adjusted, it is steadied by the pegs 30, which, as shown in Fig. 3 of the drawings, are provided with sharpened points to sink into the ground. The pegs 30 have rack sections 31, the teeth whereof engage gear wheels 32, which gear wheels are mounted on stud shafts having wrench ends 33, as seen best in Fig. 1 of the drawings. The shafts are provided with ratchet wheels 34, the teeth whereof are engaged by pawls 35. When the pegs are driven into the ground, the machine is held sufficiently rigid to withstand the vibration of the sawing mechanism.

The sawing mechanism employs a saw blade 23. The blade 23 is clamped in heads 36, as shown best in Fig. 2 of the drawings. The heads 36 are mounted in guide blocks 37 and on the wrist pins 38 thereof are pivotally connected pitman rods 39, which rods are pivotally connected with crank wheels 40. The wheels 40 are operatively connected with clutches 42. The shafts 41 are driven by any suitable prime mover, that indicated in the drawings being an electric motor 43. The motor provides a three-speed driving mechanism comprising the pulleys 44, 45 and 45ª, which are successively connected by a belt 46, with driven pulleys 47, 47ª and 47ᵇ on one of the shafts 41. Provision is made for taking up the slack in the belt 46, employing to this end, an idler 48 mounted in swinging brackets 49. At the outer ends of the two shafts 41, at opposite sides of the machine, are pulleys 50, said pulleys being operatively connected by a driving belt 51. The slack in the belt 51 is absorbed by idlers 52, which normally rest above and absorb the slack of the said belt.

From the foregoing, it will be seen that when the motor 43 is energized, the shafts 41 and clutches 42 mounted thereon, and the crank wheel 40, are rotated in unison by reason of the union of the two shafts through the pulleys 50 and belt 51. The wheels 40 operate to reciprocate the blocks 37 and the saw 23 connecting the said blocks. Under these circumstances, it is obvious that if the cutting edge of the saw blade 23 be advanced against the tree trunk or other article to be sawed, it is severed by the said blade. It will be observed that during the operation of the saw blade, it is maintained clear of gum or similar substance by brushes 53, said brushes being arranged as seen best in Fig. 2 of the drawings, on opposite sides of the blade, to receive any substance which would tend to adhere thereto.

Figure 4:
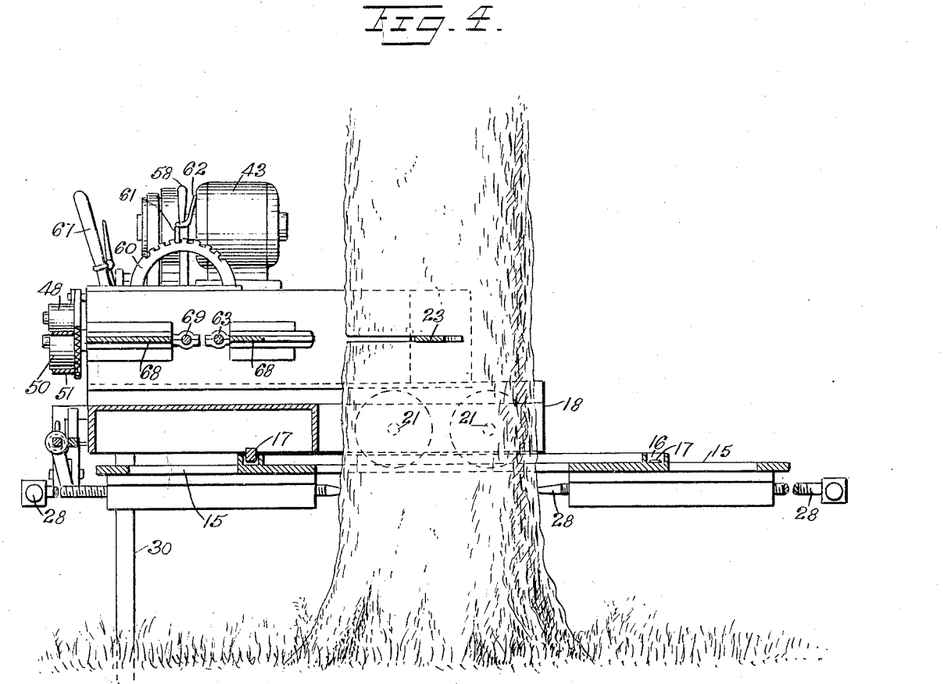
Fig. 4 is a longitudinal vertical section, the section being taken as on the line 4—4 in Fig. 1.
Figure 5:
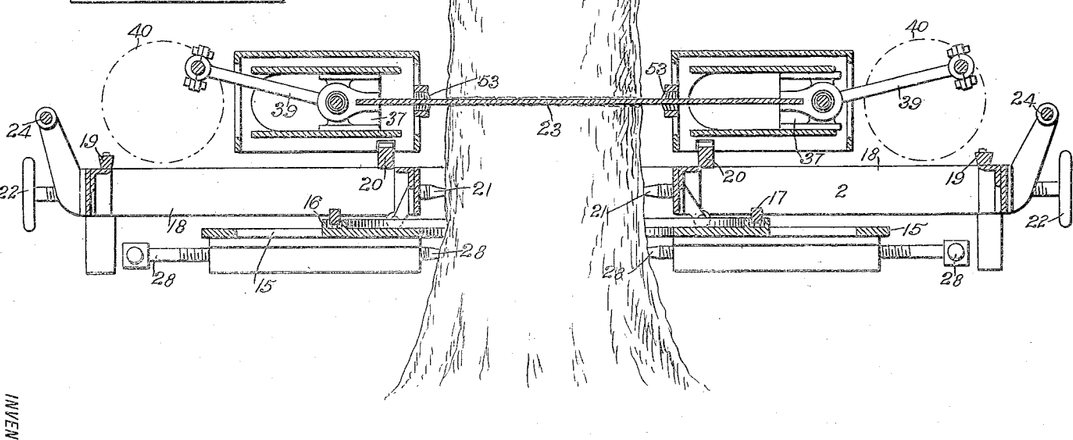
Fig. 5 is a transverse vertical section of the machine, the section being taken as on the line 5—5 in Fig. 1.
Figure 6:
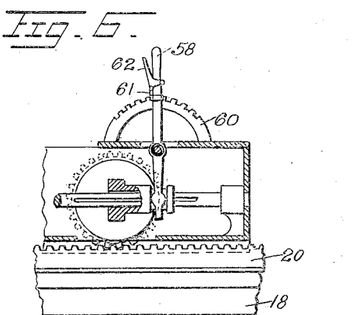
Fig. 6 is a detail view on an enlarged scale, showing in section a portion of the feeding mechanism, the section being taken as on the line 6—6 in Fig. 1.
Figure 7:
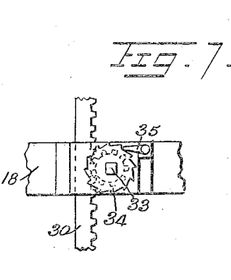
Fig. 7 is a detail view of the adjusting mechanism for supporting the machine.

The rails 19 and racks 20 are employed to advance and retract the frame 18. The rails 19 are wedge-shaped to overhang guiding grooves formed in a runner plate at the outer edges of the frames 54, supporting the sawing mechanism. When the frames 54 are stationary on the frame 18, the friction wheel 55 is at the neutral or central position of the friction disk 56. When it is desired to advance the frames 54 by power, the friction wheel 55 is shifted over the surface of the disk 56, either to the forwarding or reversing side of the center thereof. The wheel 55 is keyed or splined to a countershaft 57, and is moved lengthwise thereof by a lever 58. The countershaft 57 is driven in correspondence with the shaft 41, by means of a sprocket chain 59, which, together with sprocket wheels mounted on the shafts 41 and 57, respectively, constitute a transmission mechanism connecting the said shafts. By the ratio of the sprocket wheels, the desired speed of the shaft 57 is accounted for. The lever 58 is shifted over and held in position on a quadrant 60, by a pawl 61, as seen best in Figs. 4 and 6 of the drawings. A grip lever 62 lifts the pawl 61 when it is desired to shift the lever 58.

The friction disk 56 is fixedly mounted on a shaft 63. The shaft 63 has adjacent the opposite ends thereof, permanently mounted thereon, gear wheels 64, the teeth of which are meshed with the teeth of the racks 20. Therefore, as the shaft 63 is rotated with the disk 56, by the wheel 55, the frames 54 and mechanism carried thereby are advanced and retracted from the working position of the saw blade 23 and at a speed corresponding with the engaging position of the wheel 55 with the wheel 56. Band brakes 65 operatively engage brake drums 66, fixedly mounted on the shaft 63, adjacent the wheel 64. The band brakes 65 are operated by brake levers 67.

By means of the braking mechanisms described, the movement retrogressively or progressively of the frames 54 is controlled. The frames 54 are structurally united by plates 68. The plates 68 provide bearings for the shafts 63 and 69, the latter having mounted rigidly at the ends thereof, pinions 70, the teeth of which pinions are meshed with the teeth of the pinions 71 with which the shaft 63 is provided. By transmitting the torque strain of the shaft 63 from one of the pinions 71 to the other pinion 71, through the shaft 69, torsional bends or flexure is largely overcome or totally avoided.

The sawing mechanism above described is controlled or initiated and suspended by withholding or permitting the cones 72 to engage the clutches 42. To this end, the cones 72 are operatively connected by rocking levers 73 and links 74, with controlling levers 75. The cones 72 of the clutches 42 are preferably adjusted so that the clutch devices are capable of operating the saw 23, under ordinary conditions. However, should the saw bind or stick, or tend to buckle, the clutch devices will automatically slip to take care of the situation. It is obvious that the function of the clutch devices is to provide automatic means to take undue shocks or strains off of the saw 23.

*Operation.*

When provided with a sawing mechanism such as described, the operation is as follows: The platform 15 is first installed and set at the angle or inclination at which the preliminary cut is to be made if starting to fell a tree. In felling trees, it has been found desirable to preliminarily form what is known as a kerf. The kerf is wedge-shaped, the bottom cut or side being preferably inclined at an angle and the upper side horizontal. When the kerf is removed, a part of the support of the tree trunk is taken away in the direction in which it is desired the tree shall fall. When the platform 15 is adjusted, the points of the screws 28 are driven into the trunk of the tree and the section 25 is rigidly installed so that the groove 16 is complete. The frame 18 is then lifted to position on the platform 15, and at the upper inclined portion thereof. The motor 43 is started, the frame 54 being retracted on the racks 20 and rails 19 until the blade 23 is clear of the trunk of the tree. When starting the motor, the levers 75 are drawn back so that the cones 72 are withdrawn from the clutches 42. After the motor has gained sufficient headway, the cones 72 are permitted to grip the clutches 42 and the saw blade 23 is then rapidly reciprocated.

The friction wheels 55 are moved to a neutral or central position on the disk 56, and, if desired, the frame 54 is advanced until the teeth of the blade 23 engages the trunk of the tree.

Either before or at this stage of the operation, the pointed ends of the screws 21 are driven into the trunk of the tree so that the frame 18 is held positively engaged with the trunk of the tree during the remainder of the operation of the machine.

The lever 58 is now moved to shift the wheel 55 to the side of the disk 57, which will rotate the shaft 63 and gear wheel 64 thereon to advance the frames 54 and the blade 23 toward the center of the tree trunk.

When the blade 23 has been inserted sufficiently far into the tree trunk to form a satisfactory kerf, the operator moves the friction wheel 55 to the reversing side of the disk 56, and preferably to a position thereon to rapidly rotate the wheels 64, and quickly withdraw the blade 23 from the cut which has been performed. If necessary the frames 54 are arrested by manipulating the levers 67 and the brake band 65.

To level the machine to complete the kerf, the laterally-disposed screws 28 are held in the gripping position to the trunk of the tree, while the longitudinally-disposed screws 28 are retracted to release the tree. This forms of the first two screws, pivots on which the platform 15 and parts supported thereby can be swung to a horizontal position. When the platform has been swung to this position, the screws 28 previously loosened are retightened so that the platform 15 is held stationary, and the saw blade 23 will be found in position to perform a horizontal cut which when completed, will form the top cut of the kerf.

The sawing operation is resumed until the blade 23 has completed the cut for the kerf, when again the operation of the wheels 64 is reversed and the sawing machine retracted until the blade clears the tree trunk. The wedge-shaped block is now removed from the kerf, and the screws 21 are retracted from engagement with the trunk of the tree. The frame 18 is now swung around the center of the trunk and around the platform 15 in the groove 16 and on the rollers 17 therein until the cutting position of the machine is reversed from that in which it made the kerf cuts. When thus positioned, the screws 21 are driven firmly into the trunk of the tree and the pegs 30 are driven into the ground.

As the tree is to be felled while the sawing mechanism is in this position, the platform 15 is removed leaving the frame 18 and sawing mechanism mounted thereon supported by the pegs 30. To remove the platform 15, the screws 28 are retracted, the section 25 is removed and the platform is then taken from the tree trunk.

Preparatory to felling the tree, braces 76, such as shown by broken lines in Fig. 3 of the drawings, are engaged with the trunk of the tree at the far side thereof and sufficiently high on the trunk to steady or correct any sway which the trunk may have during the subsequent cutting operation. Preferably, the braces 76 are formed in two parts, the parts 77 being tubular to contain the lower portions of the braces, and some means of elongating the combined length of the two parts is employed in the tubular portions 77.

The braces 76 having been installed, the sawing mechanism is operated so that the blade 23 is carried through the tree trunk at the level of the upper plane on which the kerf was cut. As the sawed section of the trunk is weakened, the braces 76—77 are elongated to press the trunk of the tree over toward the kerf cut, which ultimately insures the falling of the tree on the kerfed side and in line with the opened portion of the sawing mechanism or of the frames 18 and 54 thereof. It will be understood that the sawing machine is removed prior to felling the tree.

Figure 8:
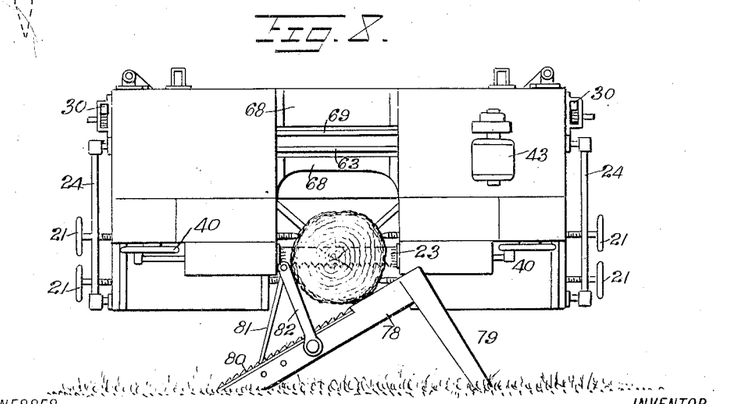
Fig. 8 is a side view of the machine, showing the same disposed as in operative relation to the felled timber, showing the same in the operation of dividing the timber into logs.

When the tree has fallen, the machine is employed for dividing it into logs. To accomplish this, the tree trunk is mounted on horses, such as shown in Fig. 8 of the drawings, wherein the legs 78 are supported at one end by struts 79, and where the legs 78 are furnished with ratchet bars 80. Long brace pawls 81 engage the teeth of the ratchet bars 80 to hold lag bars 82 in supporting relation to the tree trunk, said lag bars 82 forming in conjunction with the legs 78, supporting crutches for the tree trunk. The sawing machine including the frame 18 is then lifted above the tree trunk, and the screws 21 and hooks 90ª are embedded in the tree trunk. The sawing mechanism is operated as above described, the blade 23 being sent through the trunk to sever a log section therefrom. One log section having been thus cut, the sawing mechanism is shifted to sever the second log and so on until the trunk of the tree is entirely consumed.

Figures 9, 10:
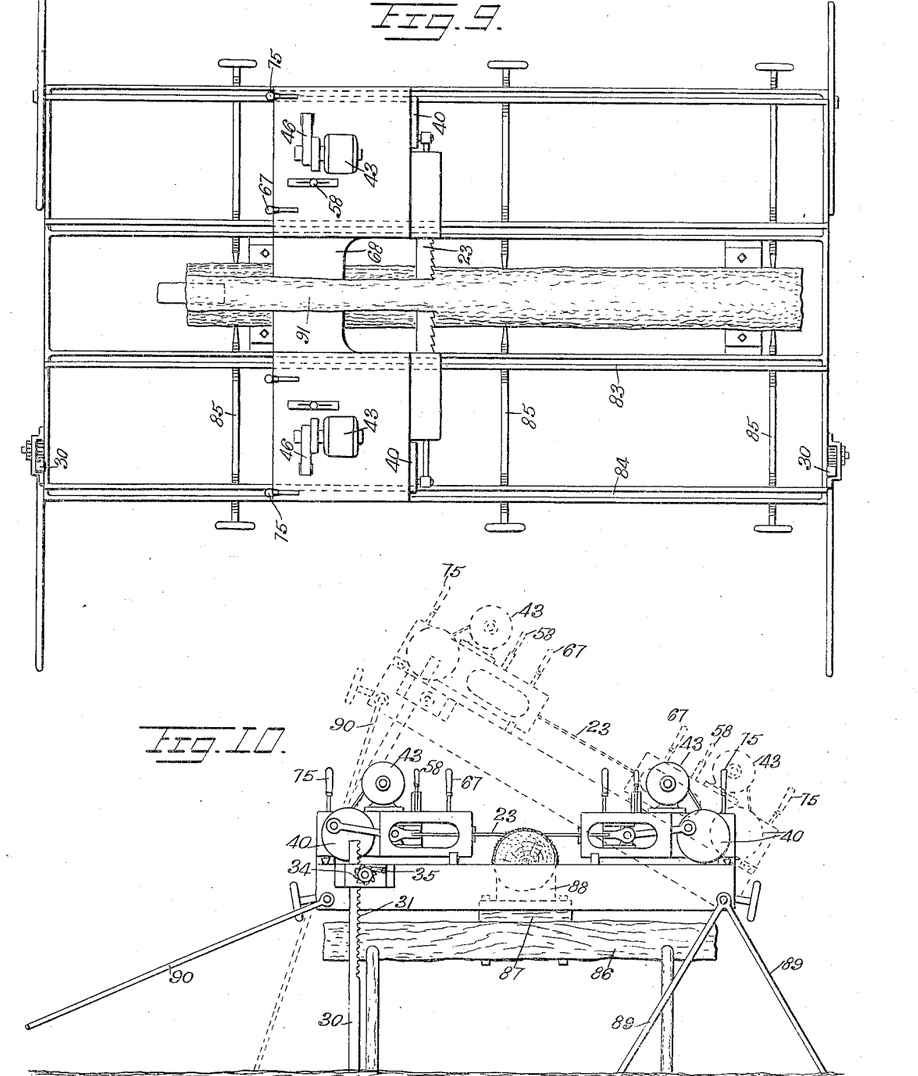
Fig. 9 is a plan view showing the machine as in the operation of trimming the logs for converting the same into beams.
Fig. 10 is an end view of the same, showing in connection therewith the machine tilted to a position to receive the logs when being trimmed as "timber."

As shown in Fig. 9 of the drawings, the sawing machine further lends itself to the operation of squaring the logs, thus forming the same into "timbers." When using the sawing mechanism in this way, an elongated frame having racks and rails 84 extended the full length of the logs to be cut, is used. This frame employs elongated lag screws 85, which may be forced into the log to hold the same while cutting is being performed.

As shown best in Fig. 10 of the drawings, the log is supported by horses 86, on which bolster blocks 87 are mounted. The bolster blocks 87 have curved saddles 88, shown in dotted lines in said figure, for supporting the log while it is being cut. The frame is also supplied with the pegs 30 described with reference to the frame 18. To further brace the elongated frame, brace rods, such as indicated by the numerals 89 and 90, are employed. These may be of any desired shape and length.

It is obvious that when the frame 54 is placed upon the elongated frame and on the legs 83 thereof, the blade 23 is reciprocated and the power being turned on, the frame 54 and sawing mechanism continue to move lengthwise of the log until the top slab 91 is removed therefrom. The sawing mechanism is then retracted and the log turned for the removal of the slab forming one of the sides of the completed "timber."

*Claims.*

1. In a machine of the character described, a circular platform provided upon one side with an opening for receiving the tree when it falls, a platform section secured to the platform within the opening and adapted to be removed therefrom, radially adjustable elements carried by the platform and platform section and adapted to lock the same to the tree, said platform and platform section being provided with a circular track, a working-frame supported by the platform and having means to engage the circular track so that said working-frame may be shifted in a circular path around the tree, said working-frame having an opening upon one side adapted to be arranged near the first named opening, frames arranged upon said working-frame and being connected to move as a unit transversely of the working-frame, rotatable crank elements carried by said frames, a saw having connections with said crank elements to be driven thereby, friction clutches connected with the crank elements to drive them, shafts connected with elements of the friction clutches, driving connecting means between the shafts, and a prime mover connected with one shaft to drive it.

2. In a machine of the character described, a circular platform adapted to surround a tree in spaced relation and provided upon one side with an opening for receiving the tree when it falls, a platform section held within the opening of the platform and adapted to be removed therefrom, means to clamp the platform and platform section with the tree, said platform and platform section being provided with a circular track, a working-frame supported by the platform and platform section and having means to engage the circular track so that said working-frame may be shifted in a circular path around the tree, said working-frame having an opening upon one side thereof adapted to be arranged near the first named opening, means to clamp said working-frame to the tree, frames arranged upon said working-frame and being connected to move as a unit transversely of the working-frame, means to move said frame transversely of the working-frame, rotatable crank elements carried by said frames, reciprocatory heads connected with the crank elements to be driven thereby, a saw having connections with said heads, friction clutches connected with the crank elements to drive them, shafts connected with elements of the friction clutches, driving connecting means between the shafts, and a prime mover connected with one shaft to drive it.

3. In a machine of the character described, a substantially circular platform adapted to surround a tree, a working-frame supported by the platform and adapted to be shifted in a circular path around the tree, sawing mechanism carried by the working-frame, a prime mover to drive the sawing mechanism, and means operated by the prime mover to advance the sawing mechanism toward and away from the tree, said means being adjustable to vary the speed of the shifting movement of the sawing mechanism independently of the speed of the prime mover.

4. In a machine of the character described, a frame adapted to be arranged near the tree to be cut, said frame having its ends extending upon opposite sides of the tree, reciprocatory heads carried by the ends of the frame, a saw connected with the heads, rotatable crank elements carried by the frame and connected with the heads to move them, friction clutch devices connected with the crank elements to drive them, shafts connected with elements of the clutch devices, driving connecting means between the shafts, and a prime mover connected with one shaft to drive it.

5. In a machine of the character described, a frame adapted to be arranged near the tree to be cut, said frame having its ends extending upon opposite sides of the tree, rotatable crank elements carried by the ends of the frame, a reciprocatory saw, means connecting the saw and the crank elements, friction clutch devices connected with the crank elements to drive them, means to adjust the friction clutch devices, shafts connected with elements of the clutch devices to drive them, driving connecting means between the shafts, and a prime mover to drive one shaft.

EDWIN LOUIS DEAN.